(12) United States Patent
Matsumoto

(10) Patent No.: US 9,641,821 B2
(45) Date of Patent: May 2, 2017

(54) IMAGE SIGNAL PROCESSING DEVICE AND IMAGE SIGNAL PROCESSING METHOD

(71) Applicant: Panasonic Corporation, Osaka (JP)

(72) Inventor: Kentaro Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 541 days.

(21) Appl. No.: 14/045,237

(22) Filed: Oct. 3, 2013

(65) Prior Publication Data

US 2014/0085413 A1    Mar. 27, 2014

Related U.S. Application Data

(63) Continuation of application No. PCT/JP2013/000618, filed on Feb. 5, 2013.

(30) Foreign Application Priority Data

Sep. 24, 2012   (JP) ................................. 2012-209228

(51) Int. Cl.
 *H04N 13/00* (2006.01)

(52) U.S. Cl.
 CPC ..... *H04N 13/0007* (2013.01); *H04N 13/0018* (2013.01); *H04N 13/0022* (2013.01)

(58) Field of Classification Search
 CPC ........... H04N 13/0007; H04N 13/0018; H04N 13/0022
 See application file for complete search history.

(56) References Cited

U.S. PATENT DOCUMENTS

| 7,324,687 B2 | 1/2008 | Zitnick, III et al. |
| 2004/0109004 A1* | 6/2004 | Bastos ................. G06T 15/405 345/587 |
| 2005/0105610 A1* | 5/2005 | Sung ........................ G06T 5/50 375/240.01 |
| 2010/0014781 A1* | 1/2010 | Liu ..................... H04N 13/0022 382/285 |

(Continued)

FOREIGN PATENT DOCUMENTS

| JP | 9-27969 | 1/1997 |
| JP | 11-248446 | 9/1999 |

(Continued)

OTHER PUBLICATIONS

Machine Translation of Japanese Unexamined Patent Publication No. 2012-128884 previously cited in an IDS filed on Oct. 3, 2013.

*Primary Examiner* — Mohammed Rahaman
(74) *Attorney, Agent, or Firm* — Wenderoth, Lind & Ponack, L.L.P.

(57) ABSTRACT

An obtaining unit obtains, for the stereoscopic image signal, depth information indicating a depth value in each position in an image plane. A smoothing unit smoothes the depth information in the image plane. A correction unit corrects the depth information which has been smoothed and expands a range of an area having a depth value of a foreground in a boundary portion between the foreground and a background. An image generation unit generates, using the depth information which has been corrected, a new stereoscopic image from the stereoscopic image signal.

8 Claims, 14 Drawing Sheets

PARALLAX MAP AFTER SMOOTHING

(56) References Cited

U.S. PATENT DOCUMENTS

| | | | |
|---|---|---|---|
| 2010/0315488 A1 | 12/2010 | Kim et al. | |
| 2011/0234765 A1 | 9/2011 | Tanaka | |
| 2011/0261050 A1* | 10/2011 | Smolic | G06T 15/20 345/419 |
| 2012/0281906 A1* | 11/2012 | Appia | H04N 13/026 382/154 |
| 2012/0308119 A1* | 12/2012 | Ogata | G06T 7/0075 382/154 |
| 2012/0308203 A1* | 12/2012 | Matsudo | H04N 13/0022 386/241 |
| 2012/0314933 A1* | 12/2012 | Morifuji | H04N 13/0022 382/154 |
| 2014/0002595 A1* | 1/2014 | Po | H04N 13/0011 348/43 |

FOREIGN PATENT DOCUMENTS

| | | | |
|---|---|---|---|
| JP | 2001-175863 | 6/2001 | |
| JP | 2010-87807 | 4/2010 | |
| JP | 2011-203811 | 10/2011 | |
| JP | 2012-128884 | 7/2012 | |
| JP | 2012128884 | * 7/2012 | G06T 1/00 |

* cited by examiner

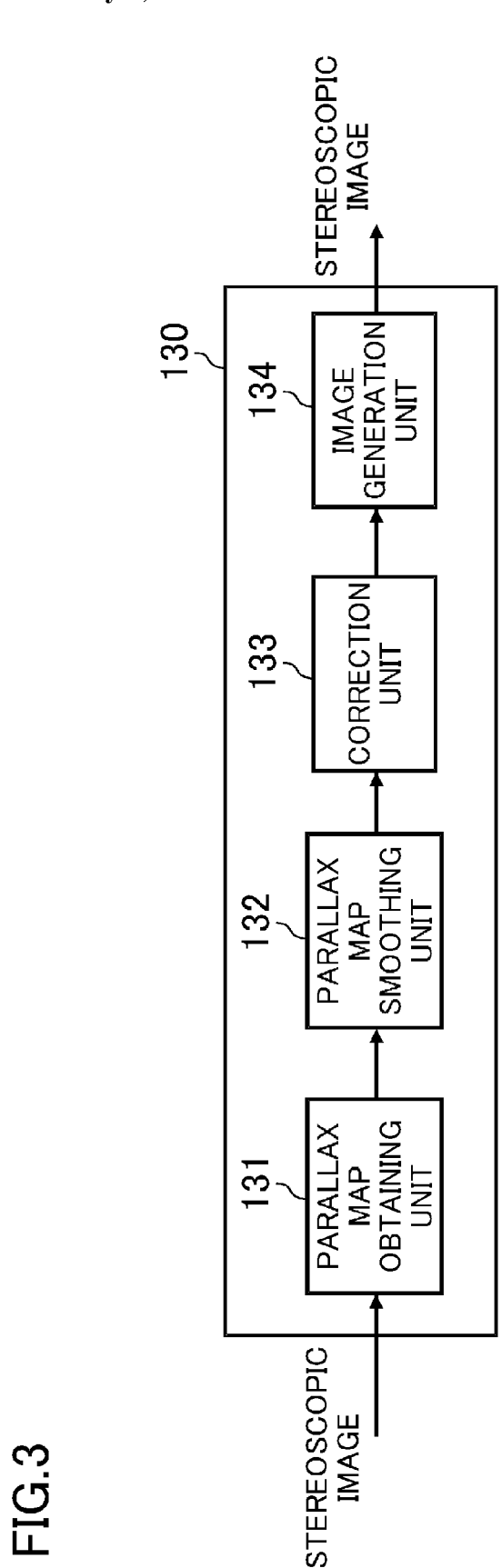

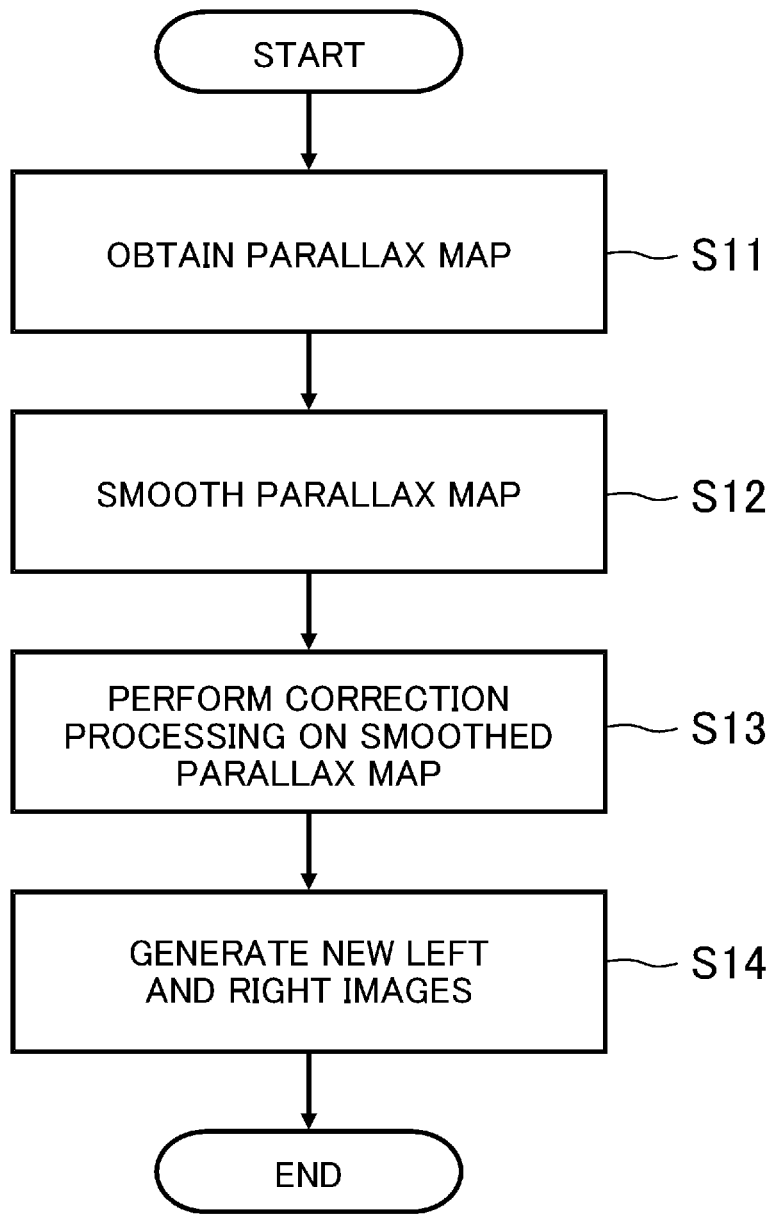

FIG.5A  PARALLAX DETECTION RESULT
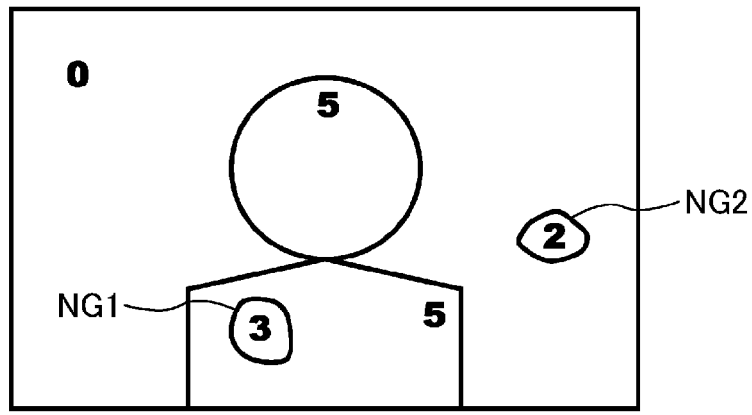
FIG.5B  PARALLAX MAP AFTER SMOOTHING
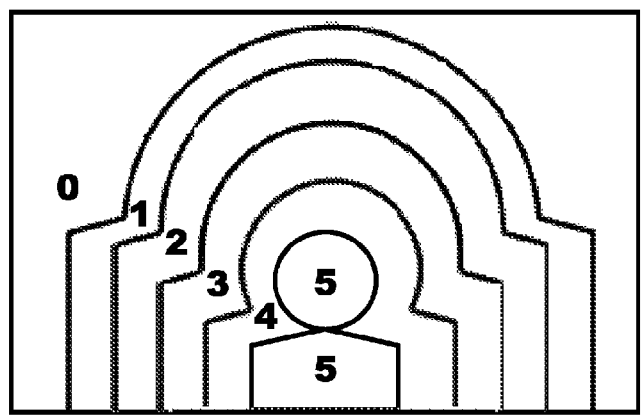
FIG.5C  PARALLAX MAP AFTER CORRECTION
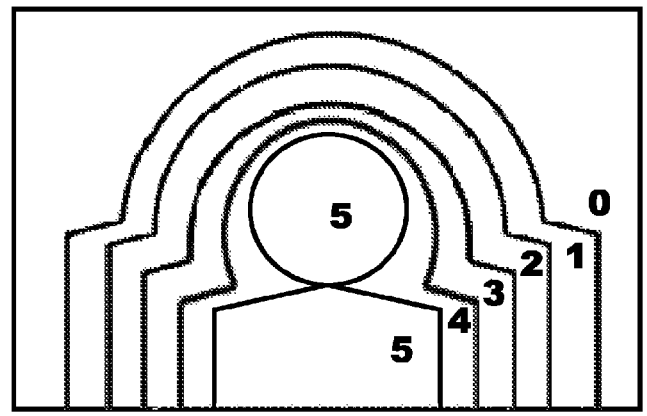

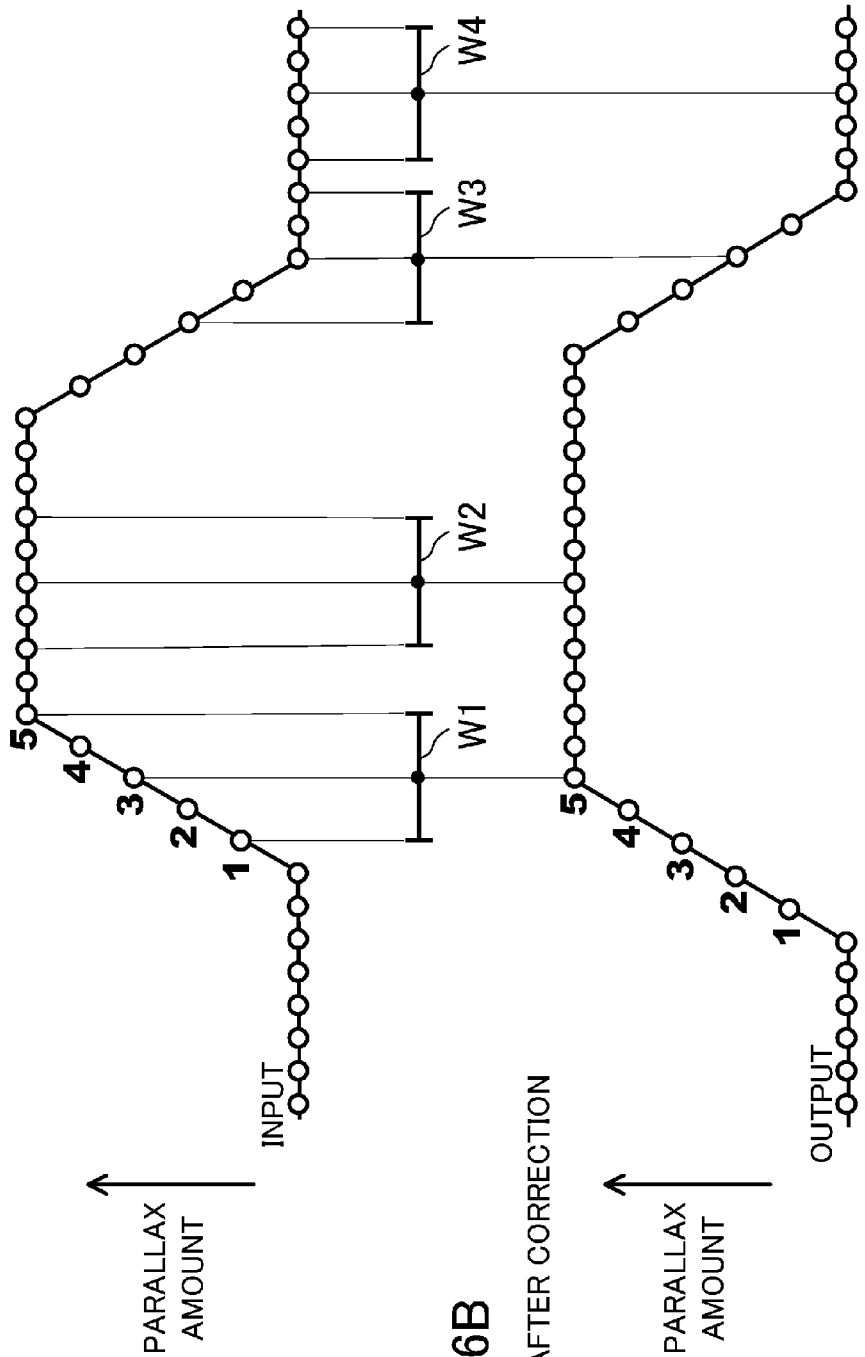

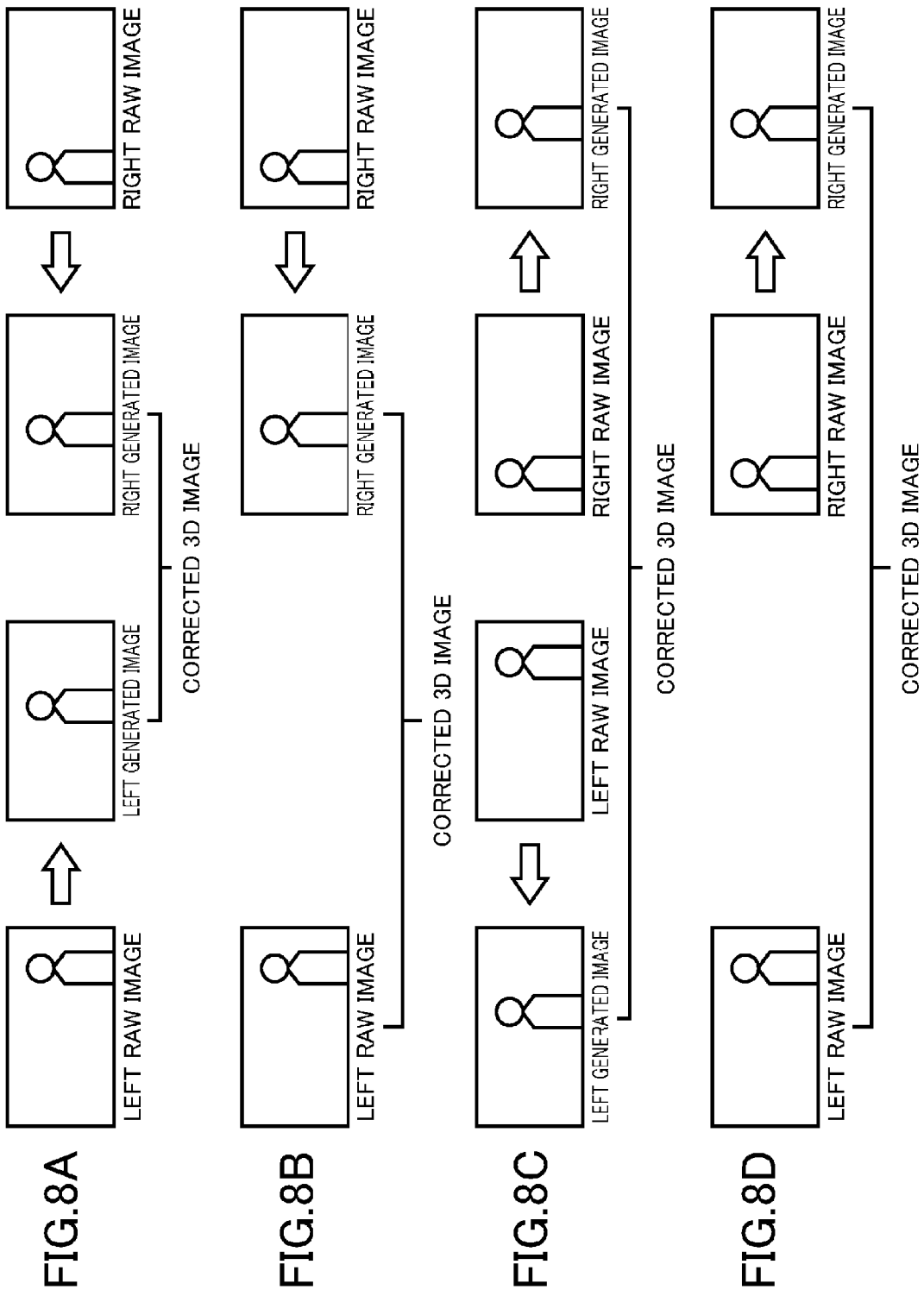

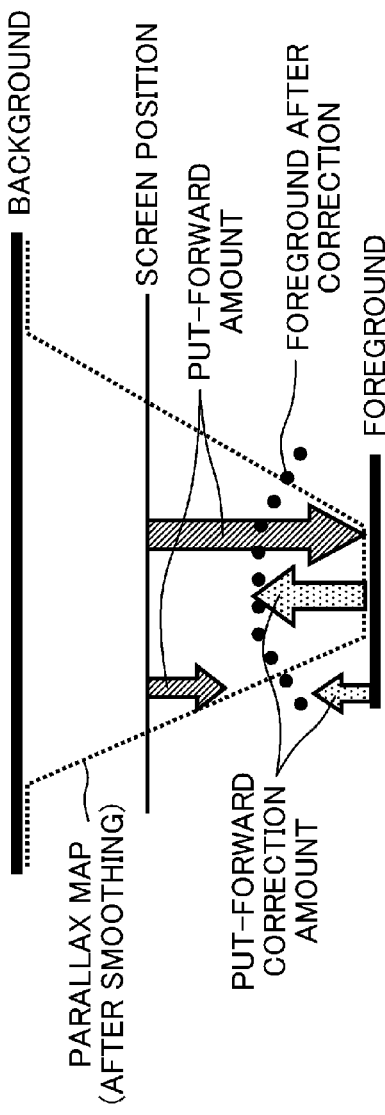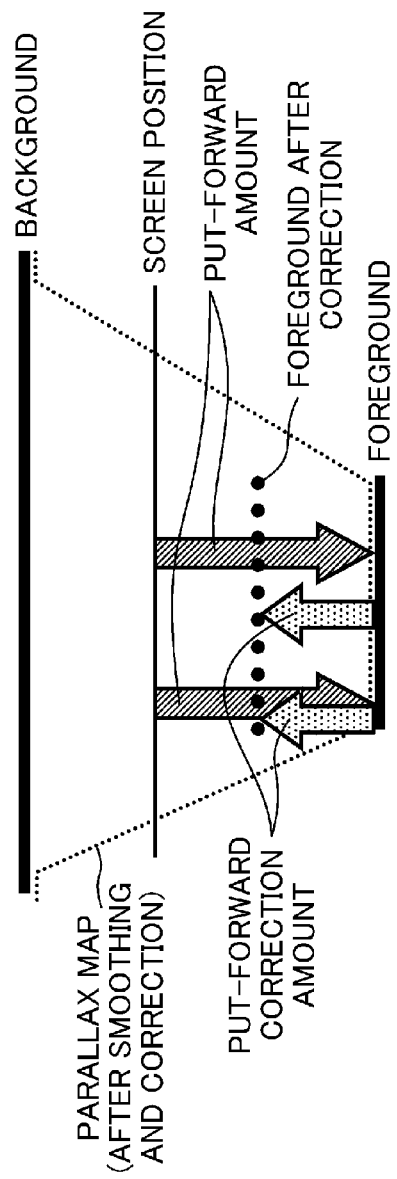

IMAGE SIGNAL PROCESSING DEVICE AND IMAGE SIGNAL PROCESSING METHOD

CROSS-REFERENCE TO RELATED APPLICATION

This is a continuation of PCT International Application PCT/JP2013/000618 filed on Feb. 5, 2013, which claims priority to Japanese Patent Application No. 2012-209228 filed on Sep. 24, 2012. The disclosures of these applications including the specifications, the drawings, and the claims are hereby incorporated by reference in their entirety.

BACKGROUND

The present disclosure relates to an image signal processing device that processes an input stereoscopic image signal.

Japanese Patent Publication No. 2001-175863 describes that, in multi-viewpoint image interpolation device, depth information and parallax information are smoothed to reduce errors thereof, and missing depth information and parallax information are interpolated to improve the quality of an interpolated image.

The present disclosure may provide an image signal processing device that can generate a stereoscopic image which looks more natural to a viewer.

SUMMARY

An image signal processing device according to an embodiment of the present disclosure is an image signal processing device which processes an input stereoscopic image, the device including an obtaining unit configured to obtain, for the stereoscopic image signal, depth information indicating a depth value in each position in an image plane, a smoothing unit configured to smooth the depth information in the image plane, a correction unit configured to correct the depth information which has been smoothed and expand a range of an area having a depth value of a foreground in a boundary portion between the foreground and a background, and an image generation unit configured to generate, on the basis of the depth information which has been corrected, a new stereoscopic image from the stereoscopic image signal.

An image signal processing device according to an embodiment of the present disclosure is effective in generating a more natural stereoscopic image.

BRIEF DESCRIPTION OF THE DRAWINGS

FIG. 3 is a diagram illustrating an example functional configuration of a new stereoscopic image generation unit in FIG. 2.

FIG. 4 is a flowchart of new stereoscopic image generation processing according to the first embodiment.

FIG. 5A is a view illustrating an example parallax map, FIG. 5B is a view of an example parallax map after smoothing processing, and FIG. 5C is a view of an example parallax map after correction processing.

FIGS. 6A and 6B are charts illustrating correction processing using a maximum value filter.

FIGS. 8A-8D are views illustrating examples of image generation when stereoscopic effect correction is performed.

FIGS. 9A and 9B are views illustrating advantages of correction processing.

DETAILED DESCRIPTION

Embodiments will be described in detail below with reference to the attached drawings. However, unnecessarily detailed description might be omitted. For example, detail description of well-known techniques or description of the substantially same elements might be omitted. Such omission is intended to prevent the following description from being unnecessarily redundant and to help those skilled in the art easily understand it.

Note that the present inventors provide the following description and the attached drawings to enable those skilled in the art to fully understand the present disclosure. Thus, the description and the drawings are not intended to limit the scope of the subject matter defined in the claims.

A stereoscopic image display device displays a left-eye image and a right-eye image of a stereoscopic image such that the left-eye image and the right-eye image are perceived by the left eye and the right eye, respectively. The displacement amount (parallax) of the left-eye image and the right-eye image differs for each area on an image, and the image is perceived as a stereoscopic image due to the parallax.

A stereoscopic image having a large parallax has a good stereoscopic effect, but when the parallax is excessively large, the image is hard to see for the viewer. Therefore, the technology of generating a stereoscopic image having a reduced parallax by image signal processing and displaying the generated stereoscopic image has been developed. In order to reduce the parallax of a stereoscopic image, a method is used in which a parallax between a left-eye image and a right-eye image for each area is detected and a stereoscopic image having a new parallax in accordance with the detected parallax is generated.

However, it is difficult to accurately detect the parallax only from an input stereoscopic image signal. If a stereoscopic image is generated on the basis of detection of a wrong parallax, the generated stereoscopic image is different from the contents that can actually be viewed in a stereoscopic manner.

As in Japanese Patent Publication No. 2001-175863, smoothing processing is performed on depth information and parallax information, and thus, a local error (noise, etc.) in an image plane, included in the detected parallax, may be reduced. On the other hand, smoothing processing might change a parallax amount that is normally to vary in a steep manner such that the parallax amount moderately varies. Thus, there might be cases where, when a stereoscopic image is generated on the basis of the parallax information on which smoothing processing has been performed, a stereoscopic image that is different from an original stereoscopic image might be obtained.

First Embodiment 1-1. Configuration

Figure 1:
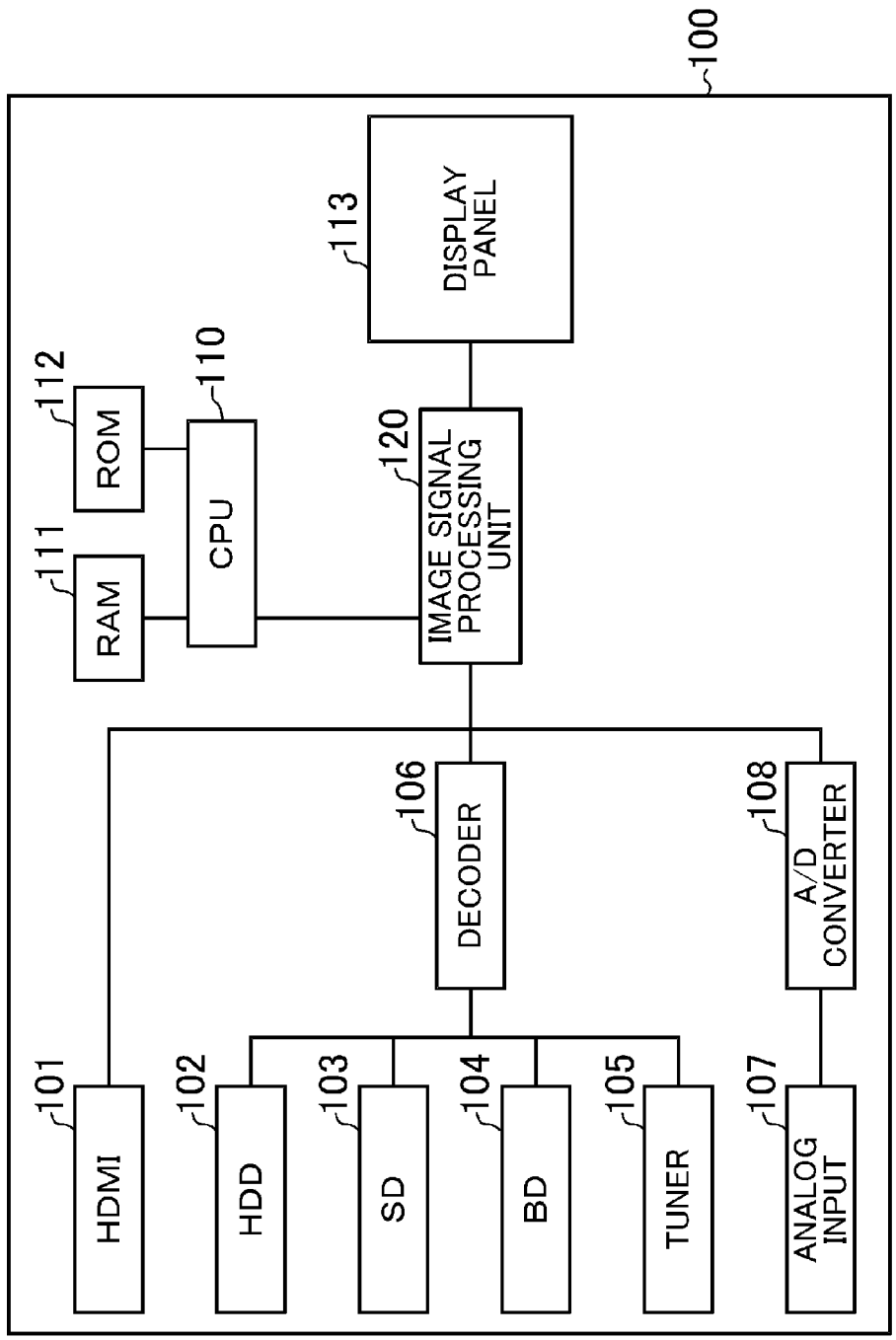
FIG. 1 is a block diagram illustrating an example functional configuration of a stereoscopic image display device according to a first embodiment.

FIG. 1 is a block diagram illustrating an example functional configuration of a stereoscopic image display device 100 according to a first embodiment. The stereoscopic image display device 100 of FIG. 1 includes a high definition multimedia interface (HDMI) unit 101, a hard disk drive (HDD) unit 102, a SD unit 103, a Blue-ray disc (BD) unit 104, a tuner unit 105, an MPEG decoder 106, an analog input unit 107, an A/D converter 108, an image signal processing unit 120, a CPU 110, a RAM 111, a ROM 112, and a display panel 113.

Note that, in the following description, the term "image" herein includes both of a still image and a moving image (a video image), unless particularly specified otherwise.

The HDMI unit 101 is an input interface to which an image signal and the like are externally input from the outside of the stereoscopic image display device 100 via an HDMI cable or the like. The HDD unit 102 reads out an image signal from a recording medium, such as a hard disk drive, etc., in which an image is recorded. The SD unit 103 reads out an image signal from a recording medium, such as an SD card, etc., in which an image is recorded. The BD unit 104 reads out an image signal from a recording medium, such as a Blue-ray disc, etc., in which an image is recorded. The tuner unit 105 receives a broadcast signal distributed from a broadcast station or a cable TV station, demodulates the broadcast signal, extracts a desired image signal, and then, outputs the image signal. The analog input unit 107 is an interface that receives, as an analog signal, an image signal externally transmitted from the outside of the stereoscopic image display device 100.

The MPEG decoder 106 decodes coded image signals input from the HDD unit 102, the SD unit 103, the BD unit 104, and the tuner unit 105, etc. The A/D converter 108 converts an analog image signal input from the analog input unit 107 to a digital image signal.

The image signal processing unit 120 performs various types of processing on image signals input from the HDMI unit 101, the MPEG decoder 106, and the A/D converter 108, etc. Specific processing contents, etc., will be described later.

The CPU 110 controls the entire stereoscopic image display device 100. The CPU 110 gives control instructions for various types of processing to the image signal processing unit 120 to cause the image signal processing unit 120 to execute preferable image signal processing. The RAM 111 is a storage region used, when the CPU 110 causes the execution of a program, etc., as a place where various variables are temporarily held. The ROM 112 is a storage region in which a program, etc., which is necessary for the CPU 110 to operate is held.

The display panel 113 displays the image signal processed by the image signal processing unit 120, etc., to the viewer, etc. Specifically, a plasma display panel (PDP), a liquid crystal display (LCD) panel, and an organic light-emitting (EL) diode (OLED) display panel, etc., may be used as the display panel 113.

When an image to be displayed is a stereoscopic image, a display that displays a stereoscopic image is used as the display panel 113. In order to present a stereoscopic image to the user, different images need to be presented separately to the left and right eyes of the user. In this embodiment, as a stereoscopic display, an example eyeglass-type 3D display that the user wears to view a stereoscopic image will be described.

Note that the HDMI unit 101, the HDD unit 102, the SD unit 103, the BD unit 104, the tuner unit 105, and the analog input unit 107 may adopt any one of input signals, and all of input signals are not necessarily needed.

Figure 2:
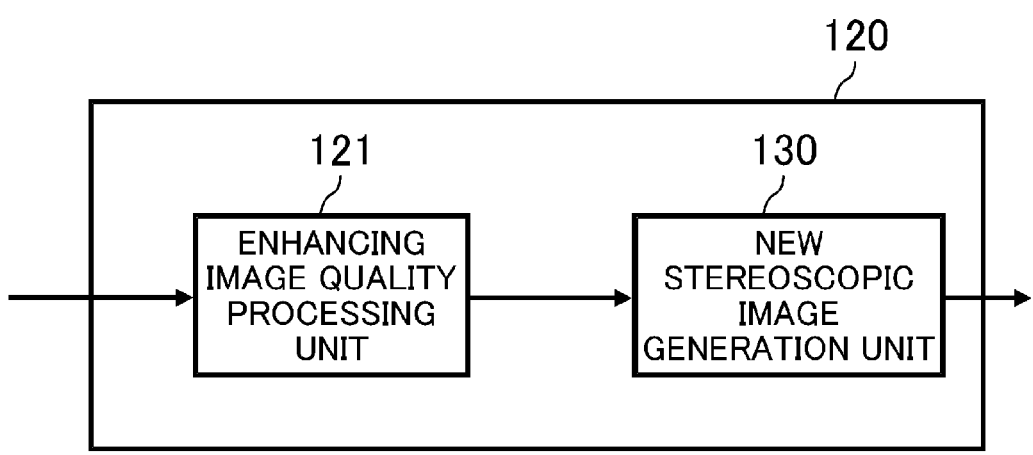
FIG. 2 is a diagram illustrating an example functional configuration of an image signal processing unit in FIG. 1.

FIG. 2 is a diagram illustrating an internal functional configuration of the image signal processing unit 120. The image signal processing unit 120 illustrated in FIG. 2 includes an enhancing image quality processing unit 121 and a new stereoscopic image generation unit 130. The enhancing image quality processing unit 121 performs enhancing image quality processing on an image to be displayed. As enhancing image quality processing, for example, noise reduction processing, crosstalk cancellation processing, edge enhancement processing, and color correction processing, etc. are performed. The new stereoscopic image generation unit 130 generates, on the basis of a stereoscopic image that is inputted or the like, a stereoscopic image viewed from a new viewpoint, and a stereoscopic image having a new parallax, etc.

FIG. 3 is a diagram illustrating a functional configuration of the new stereoscopic image generation unit 130. The new stereoscopic image generation unit 130 illustrated in FIG. 3 includes a parallax map obtaining unit 131, a parallax map smoothing unit 132, a correction unit 133, and an image generation unit 134.

The parallax map obtaining unit 131 obtains a parallax amount of a stereoscopic image that is inputted. In general, the respective contents of a left-eye image and a right-eye image in a stereoscopic image signal are displaced from each other by an amount corresponding to the parallax in the transverse (horizontal) direction. Therefore, the display positions of parts of the left-eye image and the right-eye image which correspond to each other are displaced from each other in the transverse direction in many cases. Thus, the parallax map obtaining unit 131 utilizes the foregoing characteristics to detect, as a depth value, a parallax amount in each area in an image plane of the stereoscopic image from the parts of the left-eye image and the right-eye image which correspond to each other, etc. Then, the obtained parallax is distributed in a two-dimensional (flat plane) state in a similar manner to that for the image plane, thereby serving as a parallax map as depth information.

The parallax map smoothing unit 132 performs smoothing processing on the parallax map obtained by the parallax map obtaining unit 131. That is, the depth information is smoothed in the image plane by the parallax map smoothing unit 132. In this case, smoothing processing may be processing of smoothing the entire image plane, and, alternatively, may be processing of performing smoothing in an area including a predetermined number of pixels forming the image plane.

The correction unit 133 performs correction processing on the parallax map on which smoothing processing has been performed by the parallax map smoothing unit 132. The purpose of the correction processing is to cause a stereoscopic image newly generated on the basis of the parallax map on which smoothing processing has been performed to have a more natural stereoscopic effect. The details of this processing will be described later.

The image generation unit 134 generates a stereoscopic image at a new viewpoint or a stereoscopic image having a new parallax amount, etc., on the basis of the parallax map on which smoothing processing and correction processing have been performed.

1-2. Operation

FIG. 4 is a flowchart illustrating a flow of processing performed by the new stereoscopic image generation unit 130. Note that, in the following description, the parallax amounts in the parallax map are quantified such that the parallax amount at the display surface is "0", the parallax amount at a position (a foreground side) closer to a viewer is positive, and the parallax amount at a position (a background side) more distant from the viewer is negative.

(Step S11) The parallax map obtaining unit 131 obtains, as a parallax map, the parallax amount for each of areas obtained by dividing each of image planes of the left-eye image and the right-eye image forming the input stereoscopic image. In this processing, for example, the magnitude of a "displacement" substantially in the horizontal direction between the position of an area in the left-eye image and the position of a corresponding area in the right-eye image which is estimated to have substantially the same contents as that of the area of the left-eye image is detected as the parallax amount of the area. The foregoing parallax amount is obtained in each area on the image plane, and the parallax amount in each area is indicated in a "parallax map."

Needless to say, the parallax amount may be detected with the left-eye image and the right-eye image reversed to one another. Alternatively, areas of the left-eye image and the right-eye image may be associated, for example, using a block matching method. However, a method for obtaining the parallax map is not limited to the block matching method.

(Step S12) The parallax map smoothing unit 132 smoothes the parallax map obtained by the parallax map obtaining unit 131. In this smoothing processing, from the parallax amount of an area and the parallax amount in a surrounding area thereof, included in the parallax map, the parallax amount of the area is newly determined. Even when the parallax map includes an error parallax amount or when a correct parallax amount has not been detected due to a partial defect of the original stereoscopic image, etc., the influence of an incorrect parallax amount and the other parallax amount that causes noise can be reduced by smoothing processing.

In smoothing processing, the parallax amount of the surrounding area is a big factor when the parallax amount of the area is determined. Specifically, for example, the parallax amount of the area and the parallax amounts of a plurality of surrounding areas are averaged out. Alternatively, for example, each of the parallax amounts is multiplied by a predetermined coefficient, and then, the obtained amounts are averaged out.

As another alternative, weighting addition processing may be performed in a window (area) having a certain size on the parallax map. Weighing addition processing may be performed, for example, using a Gaussian filter having a weight varying in accordance with a normal distribution. In this case, the intensity of smoothing of the Gaussian filter may be freely set to be uniform throughout the screen or for each area.

As another weighting addition processing, in order to reduce a calculation amount, a simple average value of the parallax amount in a window may be calculated. In smoothing processing using an average value, the intensity of smoothing may be changed by varying the size of a window uniformly throughout the screen or for each area.

(Step S13) The correction unit 133 performs processing of correcting the parallax map (parallax information) which has been smoothed by the parallax map smoothing unit 132 to a preferable value. The purpose of this processing is to cause a stereoscopic image newly generated on the basis of the parallax map on which smoothing processing and the like have been performed to have a more natural stereoscopic effect. Note that the parallax map on which correction processing has been performed by the correction unit 133 will be hereinafter referred to as a "corrected parallax map."

The correction unit 133 corrects the parallax amount of a foreground, which has become a closer value to a value of the background side than the original value of the parallax amount of the foreground because the parallax of a background object is mixed thereto by smoothing processing, to a closer value to a value of the foreground side. That is, the parallax map is corrected, and thus, the range of an area having the parallax amount of the foreground in the boundary portion of the foreground and the background is expanded.

In this case, as an example of correction processing, a maximum value filter is used. The maximum value filter sets a maximum value of the parallax amount in a range (window) in which the filter is applied as a representative parallax amount of the range. An image is displayed substantially in a two-dimensional, flat plane state, and thus, in general, a rectangle having a two-dimensional shape, etc., is used as a window. A specific data processing method for correction processing, etc., will be described later.

(Step S14) The image generation unit 134 generates, on the basis of the corrected parallax map output from the correction unit 133 and left and right raw images forming the input stereoscopic image, left and right images forming a new stereoscopic image. Then, the new stereoscopic image generation unit 130 outputs the generated new stereoscopic image to the display panel 113.

As described above, in the foregoing description, the parallax amounts in the parallax map and the corrected parallax map are quantified such that the parallax amount is "0" at the display surface, is positive at a position (the foreground side) closer to the viewer, and is negative at a position (the background side) more distant from the viewer. However, a method for representing the parallax map (a method for quantifying a parallax amount) is not limited thereto, and, for example, the parallax amount may be set to be positive at a position more distant side from the viewer and to be negative at a position closer to the viewer. In this case, the magnitude of the value used in the subsequent processing may be inverted, and a minimum value filter may be used, instead of the maximum value filter. That is, the correction unit 133 changes the depth value included in the depth information to a depth value indicating a most foreground side in a predetermined area including the position of the depth value. Furthermore, the position of the parallax amount "0" does not necessarily have to be on the display surface.

FIGS. 5A-5C are views illustrating how a parallax map is generated by the new stereoscopic image generation unit 130 and then changes. In FIGS. 5A-5C, values "0"-"5" represent parallax amounts.

FIG. 5A is a view illustrating an example parallax map obtained by the parallax map obtaining unit 131. An area of the parallax amount of "5" is, for example, a foreground, such as a person, and an area of the parallax amount of "0" is a background. In general, it is not easy to accurately detect the parallax map only from left and right images forming an input stereoscopic image. There might be cases where the obtained parallax map includes a value different from the parallax that the input stereoscopic image originally had, that is, for example, as an error, etc. In the example of FIG. 5A, the parallax amount in each of areas NG1 and NG2 is noise (error).

FIG. 5B is a view illustrating an example result of smoothing processing performed on the parallax map of FIG. 5A by the parallax map smoothing unit 132. In FIG. 5B, noise in the areas NG1 and NG2, etc., are reduced, as compared to FIG. 5A. Also, in FIG. 5B, as compared to FIG. 5A, the parallax amount changes more smoothly in the boundary portion between the foreground and the background and the parallax amount at the foreground side is reduced. That is, while, in FIG. 5A, the area of the parallax amount of "5" and the area of the parallax amount of "0" directly contact each other, in FIG. 5B, the area of the parallax amount of "5" and the area having the parallax amount of "0" do not directly contact each other and the areas having the parallax amounts of "1"-"4" are interposed therebetween. As a result, in the area having the parallax amount of "5" in FIG. 5A, the parallax amount goes down to "0" gradually near the boundary.

This is because the parallax map is processed by smoothing processing such that the parallax amount changes more gradually around the boundary of areas having different parallax amounts. A noise and an error, etc. generated by parallax detection processing are reduced by smoothing processing. On the other hand, around the boundary where the parallax amount greatly changes, a drastic change in the parallax amount is reduced. Thus, when a new stereoscopic image is generated on the basis of the parallax map on which smoothing processing has been performed, parallax change around the boundary of the foreground and the background might be different from parallax change that causes an actual stereoscopic effect, and thus, the new stereoscopic image might give a blur "depth feeling" to the user.

FIG. 5C is a view illustrating an example result of correction processing performed on the smoothed parallax map by the correction unit 133. In FIG. 5C, the range of the area having the parallax amount of "5" of the foreground side is expanded in the boundary portion between the foreground and the background. Thus, parallax change around the boundary of the foreground and the background can be caused, for example, to be closer to parallax change that causes an actual stereoscopic effect, so that a stereoscopic image giving a more natural depth feeling can be generated.

FIGS. 6A and 6B are charts illustrating the contents of correction processing in the correction unit 133. In FIGS. 6A and 6B, for the sake of simplicity of description, a parallax map expressed in one-dimensional manner is illustrated as an example. In FIGS. 6A and 6B, the values "1"-"5" present parallax amounts. The area having the parallax amount of "5" corresponds to a foreground.

FIG. 6A is a parallax map before correction. A range (window) in which correction processing using the maximum value filter is performed is set for the parallax map. In FIG. 6A, for illustrative purpose, four windows W1, W2, W3, and W4 are indicated. The size (that is, a length in a one-dimensional direction in this case) of each of the windows W1, W2, W3, and W4 is set to be "5" in this example.

In correction processing, each window outputs a maximum value among input values. For example, values (parallax amounts) input to the window W1 are "1," "2," "3," "4," and "5." In this case, the maximum value is "5," and accordingly, an output (corrected parallax amount) of the window W1 is "5." The value of "5" is a corrected value of a central position (the position where the input value was "3") of the window W1.

Similarly, values input to the window W2 are "5," "5," "5," "5," and "5," and accordingly, the maximum value of "5" is output. The value of "5" is a corrected value of a central position of the window W2. Values input to the window W3 are "2," "1," "0," "0," and "0," and accordingly, the maximum value of "2" is output. Values input to the window W4 are "0," "0," "0," "0," and "0," and accordingly, the maximum value of "0" is output.

As a result, FIG. 6A is corrected to be the parallax map illustrated in FIG. 6B. As compared to FIG. 6A, in FIG. 6B, the area of the foreground is expanded overall. That is, the maximum value filter of the correction unit 133 outputs the maximum value in each window, thereby greatly correcting the parallax amount of the foreground which has been reduced to a value closer to the original value of the parallax amount of the foreground. As a result, in the corrected parallax map, the area having the parallax amount of the foreground is expanded.

That is, as for the contents of correction performed by the correction unit 133, since the maximum parallax amount in a window is set as the parallax amount at a specific position of the window, the corrected parallax map generally includes parallax amounts closer to the parallax amount of the foreground. Thus, the parallax map in which the area corresponding to the foreground portion has been reduced by smoothing processing can be improved.

In general, when viewing a stereoscopic image, the viewer pays greater attention to a portion displayed at the foreground side. Therefore, if the parallax amount of the foreground portion is reduced (is shifted to the background side), the viewer of the stereoscopic image perceives a part of the foreground which normally receives greater attention, specifically, the boundary portion between the foreground and the background, etc., as the background side. Therefore, the relationship between the contents (a portion receiving attention) displayed as an image and the parallax amount might be unnatural to the viewer of the stereoscopic image, and the obtained stereoscopic image might be difficult for the viewer to view.

As in this embodiment, a part of an image which has been shifted to the background side by smoothing processing can be shifted again to be closer to the foreground side by performing correction processing on the parallax map after smoothing processing. Thus, a more natural stereoscopic image can be provided to the viewer who views the stereoscopic image. In addition, in this embodiment, smoothing processing is also performed, and thus, an error and noise, etc., included at the detection of the parallax map, etc., can be reduced.

Figure 7A:
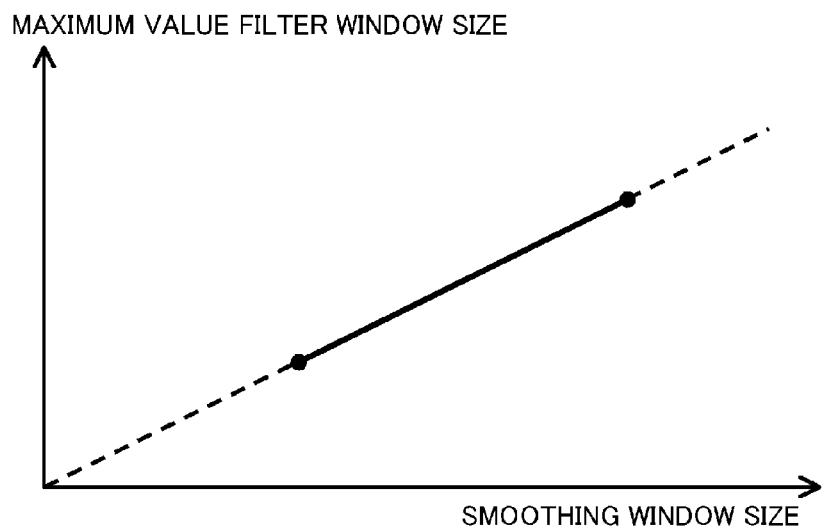
FIGS. 7A and 7B are graphs illustrating an example method for setting a window size of the maximum value filter.

In this case, the window size of the maximum value filter may be changed in accordance with the intensity of smoothing. Thus, preferable filter processing can be performed. For example, as illustrated in FIG. 7A, the larger the window size for smoothing is, the larger the window of the maximum value filter may be set. The larger the smoothing window size is, the higher the intensity of smoothing becomes. When the intensity of smoothing is high, the parallax amount at the foreground side receives much influence, and therefore, it is preferable to increase the effect of shifting the parallax amount again to the foreground side using the maximum value filter. In contrast, when the intensity of smoothing is low, the window size of the maximum value filter may be reduced.

Thus, even when the area having the parallax of the foreground side is reduced by smoothing processing, a more natural stereoscopic image can be presented to the viewer by expanding the area having the parallax of the foreground side using preferable correction processing relating to the contents of smoothing processing. Note that, in FIG. 7A, the smoothing window size and the maximum value filter window size have a linear relationship, but the relationship therebetween is not limited thereto.

The window size of the maximum value filter may be determined in accordance with the size of a block used in block matching for detecting the parallax. When the parallax is detected using block matching, an image range having the parallax of the foreground side tends to expand to the background area, and this tendency increases, as the block size increases.

That is, when the block size is large, the image range having the parallax of the foreground side has been already expanded before smoothing processing is performed, and therefore, the effect of expanding the area having the parallax of the foreground side using the maximum value filter can be reduced, thereby taking balance. Thus, the window size of the maximum value filter may be reduced, as the size of the block used in block matching increases, and may be increased, as the size of the block reduced.

Figure 7B:
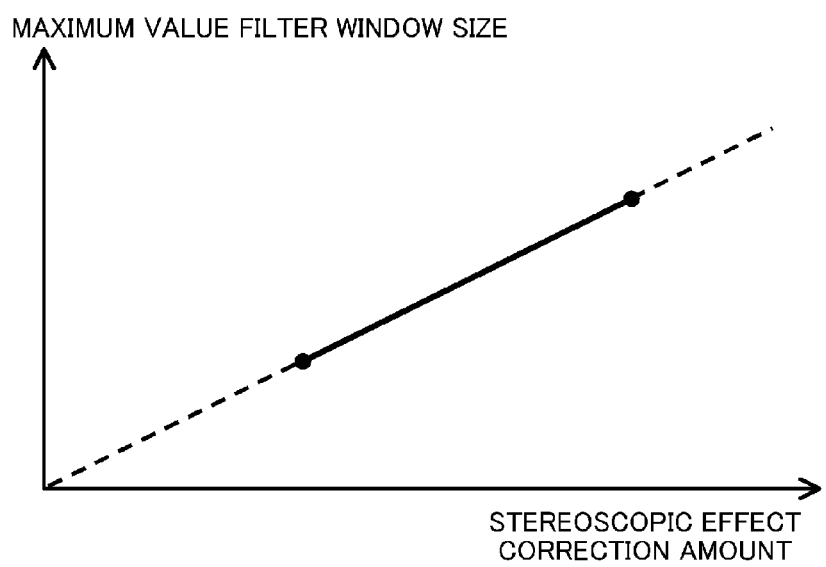

The window size of the maximum value filter may be determined in accordance with a stereoscopic effect correction amount, which will be described later. The stereoscopic effect correction amount may be set by the user. For example, as illustrated in FIG. 7B, when the stereoscopic effect correction amount is small, the window size may be set small because only a small influence is imposed even if the amount of correction performed by the maximum value filter is small. Note that, in FIG. 7B, the stereoscopic effect correction amount and the maximum value filter window size have a linear relationship, but the relationship therebetween is not limited thereto.

Note that, as correction processing in the correction unit 133, the example in which the maximum value filter is used has been described, but the present disclosure is not limited thereto. For example, when each window outputs a second largest value or an nth largest value, instead of the maximum value, similar advantages can be achieved. Note that a smaller value than the half of the number of parallax amounts included in the corresponding window is preferably set for n.

Next, stereoscopic effect correction will be described. The image generation unit 134 generates left and right images of a new stereoscopic image having a corrected stereoscopic effect using the corrected parallax map output from the correction unit 133 and left and right raw images forming an input stereoscopic image.

The image generation unit 134 calculates the parallax amount at a new viewpoint position in accordance with the following expression 1. Then, the image generation unit 134 corrects the parallax map on the basis of the calculated parallax amount to generate an image.

$$d'=d*gain \quad \text{[Expression 1]}$$

In the expression 1, d' denotes a parallax amount which is to be actually added, d denotes a parallax amount in the parallax map output from the correction unit 133, and gain denotes a setting value for the stereoscopic effect correction amount. Moreover, gain is a positive or negative value. When an image is generated on the left side relative to a raw image, a positive value is given to gain, and when an image is generated on the right side, a negative value is given to gain. The value of gain may be set, for example, by a remote control operation, etc., by the user. Alternatively, an optimal value may be automatically calculated and be set as gain. For example, the CPU 110 or the image signal processing unit 120 may set a preferable value on the basis of the relationship between the display panel 113 and the viewing position of the viewer.

Examples of image generation when stereoscopic effect correction is performed will be described with reference to FIGS. 8A-8D. First, when correction for reducing the stereoscopic effect is performed, the parallax between the left and right images is reduced. In this case, for example, as illustrated in FIG. 8A, two images generated from the left and right raw images in the direction in which the parallax reduces, that is, an image generated from the left raw image at the right thereof with a parallax and an image generated from the right raw image at the left side thereof with a parallax, are output. By the left and right generated images, a stereoscopic image with a corrected stereoscopic effect is obtained. Alternatively, for example, as illustrated in FIG. 8B, the left raw image and a generated image generated from the right raw image at the left side thereof may be output. As another alternative, in contrast, the right raw image and a generated image generated from the left raw image at the right side thereof may be output.

On the other hand, when correction for increasing the stereoscopic effect is performed, the parallax between the left and right images is increased. In this case, as illustrated in FIG. 8C, an image is generated from the left raw image at the left side thereof with a parallax and an image is generated from the right raw image at the right side thereof with a parallax. Alternatively, for example, as illustrated in FIG. 8D, the left raw image and a generated image generated from the right raw image at the right side thereof may be output. As another alternative, in contrast, the right raw image and a generated image generated from the right raw image at the left side thereof may be output.

By the above-described processing, the stereoscopic image display device 100 according to this embodiment can display a corrected stereoscopic image having a reduced stereoscopic effect or an increased stereoscopic effect, as compared to the input stereoscopic image. That is, the stereoscopic image display device 100 according to this embodiment can display a preferable stereoscopic image in accordance with a new viewing position, and a distance from the display panel 113 to the viewing position of the user, etc.

1-3. Advantages, Etc.

Advantages of correction processing of a parallax map according to this embodiment will be described with reference FIGS. 9A and 9B. FIGS. 9A and 9B are image diagrams expressing a depth when a stereoscopic image is viewed from the top, and each of FIGS. 9A and 9B, the upper side represents the background side and the bottom side represents the foreground side. Also, the parallax of the parallax map, that is, a depth value, is represented by a narrow dashed line. FIG. 9A illustrates a state after smoothing processing is performed and before correction is performed. FIG. 9B illustrates a state after correction is performed.

As illustrated in FIG. 9A, in the parallax map after smoothing processing, the depth value gradually changes in the boundary portion between the foreground and the background. Therefore, a part of the foreground area located close to the boundary with the background has a depth value close to that of the background side than the original depth value. That is, a put-forward amount from the screen position in the foreground area is different between a part around the boundary with the background and other parts. Assume that, in this state, correction for reducing the stereoscopic effect is performed. Then, for an area, such as the original foreground area, in which the parallax is large, the correction effect causes an object to be in a distant position in accordance with the parallax. However, in the part around the boundary with the background, the parallax is smaller than that those of other parts, and thus, the amount of correction which causes the object to be in a distant position is small. That is, the put-forward correction amount for the foreground area is different between the part around the boundary with the background and other parts. As a result, the foreground area looks such that the boundary portion puts forward relatively as compared to the central portion. When a stereoscopic image is displayed in this state, the stereoscopic image might give a very uncomfortable feeling to the viewer.

As compared to the foregoing parallax map, as illustrated in FIG. 9B, in the parallax map after correction, for a part of the foreground area located around the boundary, in which the depth value has become closer to that of the background side due to smoothing processing, the parallax is corrected to be a value close to the original parallax of the foreground area. That is, the put-forward amount from the screen position in the foreground area substantially uniform. Therefore, even when correction for reducing the stereoscopic effect is performed, the foreground area is corrected such that the boundary portion is in a position substantially as distant as the central portion. As a result, the problem in which the foreground area looks such that the boundary portion appears to put forward, as compared to the central portion, does not occur, and a stereoscopic image which is easily viewable can be displayed.

As described above, in this embodiment, the stereoscopic image display device 100 includes the parallax map obtaining unit 131 serving as an obtaining unit, the parallax map smoothing unit 132 serving as a smoothing unit, the correction unit 133, and the image generation unit 134. The parallax map obtaining unit 131 obtains for an input stereoscopic image a parallax map indicating the parallax at each position in an image plane. The parallax map smoothing unit 132 smoothes the parallax amount of the parallax map in the image plane. The correction unit 133 corrects the parallax map smoothed by the parallax map smoothing unit 132 to expand the range of an area in the boundary portion between the foreground and the background, which has the parallax amount of the foreground. The image generation unit 134 generates, on the basis of the corrected parallax map, a new stereoscopic image from an input stereoscopic image signal.

Thus, the parallax map smoothed by the parallax map smoothing unit 132 is corrected by the correction unit 133, and the range of the area in the boundary portion between the foreground and the background, which has the parallax amount of the foreground is expanded. As a result, the parallax map in which change in the parallax is smoothed in the boundary portion between the foreground and the background is corrected to be a parallax map of a stereoscopic image which is easy for the viewer to view. Therefore, when a new stereoscopic image is generated from an input stereoscopic image signal, a more natural stereoscopic image can be generated.

Also, in this embodiment, the correction unit 133 performs correction for changing the parallax amount of the parallax map which has been smoothed to the parallax amount representing the most foreground side in a predetermined area of the image plane, which includes the position of the parallax amount. For example, when the foreground side has a greater parallax, correction is performed using the maximum value filter. Thus, the correction unit 133 can reliably correct the smoothed parallax map to a parallax map of a stereoscopic image which is easy for the viewer to view.

Moreover, in this embodiment, the correction unit 133 adjusts the intensity of correction in accordance with the intensity of smoothing, or in accordance with the correction amount of stereoscopic effect correction. Thus, preferable correction processing can be performed, and a more natural stereoscopic image can be presented to the viewer.

Second Embodiment

A second embodiment will be described with focus on differences of the second embodiment from the first embodiment, and description of the substantially same elements as those in the first embodiment might be omitted.

2-1. Configuration

Figure 10:
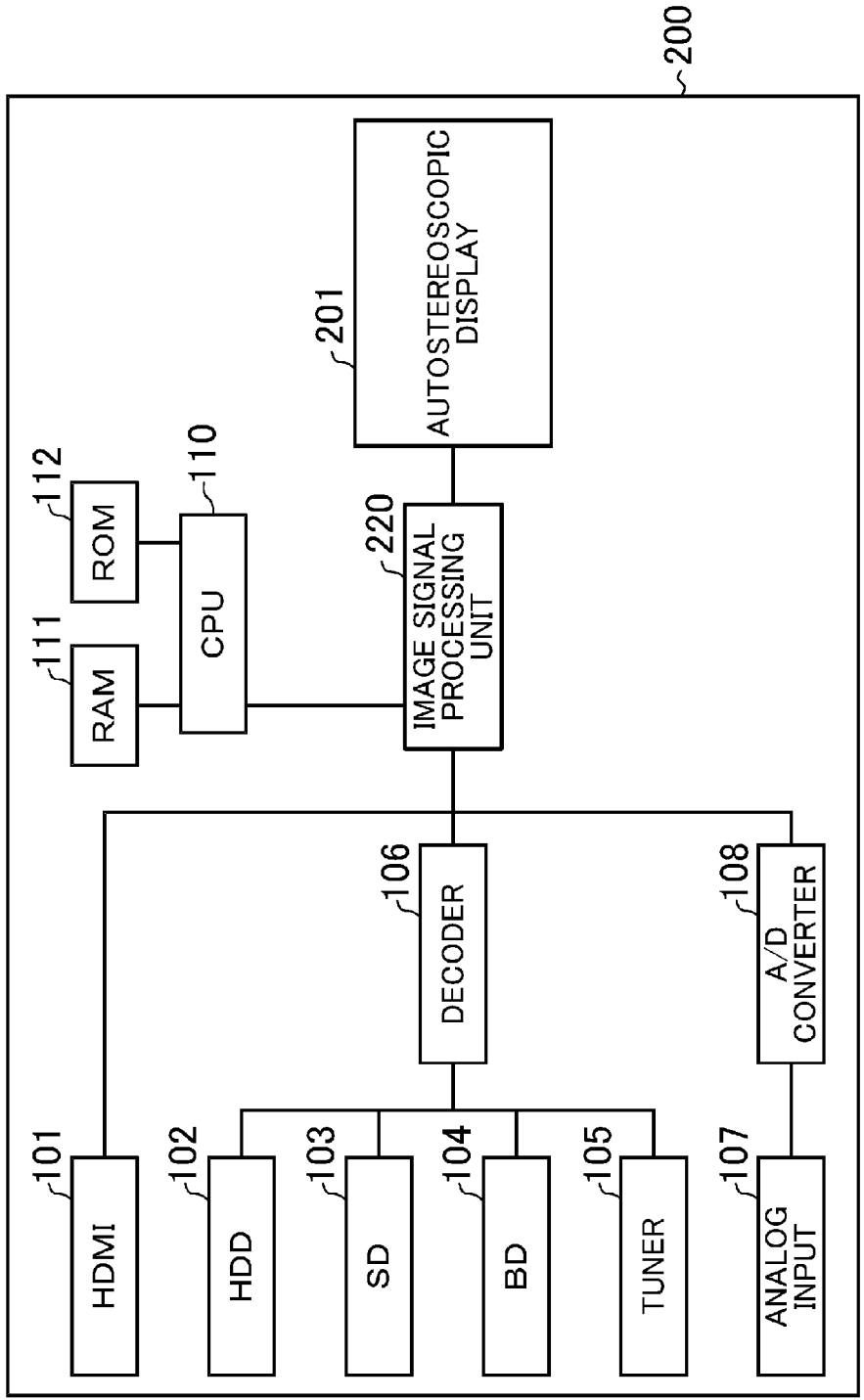
FIG. 10 is a block diagram illustrating an example functional configuration of a stereoscopic image display device according to a second embodiment.

FIG. 10 is a block diagram illustrating an example functional configuration of a stereoscopic image display device 200 according to the second embodiment. The stereoscopic image display device 200 of FIG. 10 includes a HDMI unit 101, a HDD unit 102, a SD unit 103, a BD unit 104, a tuner unit 105, a MPEG decoder 106, an analog input unit 107, an A/D converter 108, an image signal processing unit 220, a CPU 110, a RAM 111, a ROM 112, and an autostereoscopic display 201.

As compared to the stereoscopic image display device 100 described in the first embodiment, the stereoscopic image display device 200 of FIG. 10 is different in that the stereoscopic image display device 200 includes the image signal processing unit 220 and the autostereoscopic display 201, instead of the image signal processing unit 120 and the display panel 113. Other than this point, the stereoscopic image display device 200 is the substantially the same as the stereoscopic image display device 100 of the first embodiment, and therefore, other points will not be described in this embodiment.

Similar to the image signal processing unit 120 described in the first embodiment, the image signal processing unit 220 performs preferable signal processing for a stereoscopic image. The image signal processing unit 220 further performs image signal processing for a stereoscopic image, which is suitable for the autostereoscopic display 201. The details of the processing will be described later.

There are many methods, such as a parallax barrier method, and a lenticular method, etc., for the autostereoscopic display 201. Among them, any method which allows a viewer to view a stereoscopic image with the naked eye may be used, and the method used for the autostereoscopic display 201 is not limited to a particular method. There might be cases where, in order to reduce the occurrence of pseudoscopic phenomenon in which each of left and right images is presented to an opposite one of the left and right eyes due to the positional relationship between the position at which the viewer views a stereoscopic image and the autostereoscopic display 201, the autostereoscopic display 201 displays an image with more viewpoints than two viewpoints of an image displayed by the eyeglass-type, that is, four viewpoints, eight viewpoints, or even more viewpoints, A stereoscopic image that is inputted is normally a two-viewpoint image having a left-eye image and a right-eye image. The image signal processing unit 220 generates a multi-viewpoint image having more viewpoints than two.

An example where a four-viewpoint image is generated will be hereinafter described, but the present disclosure is not limited thereto.

Figure 11:
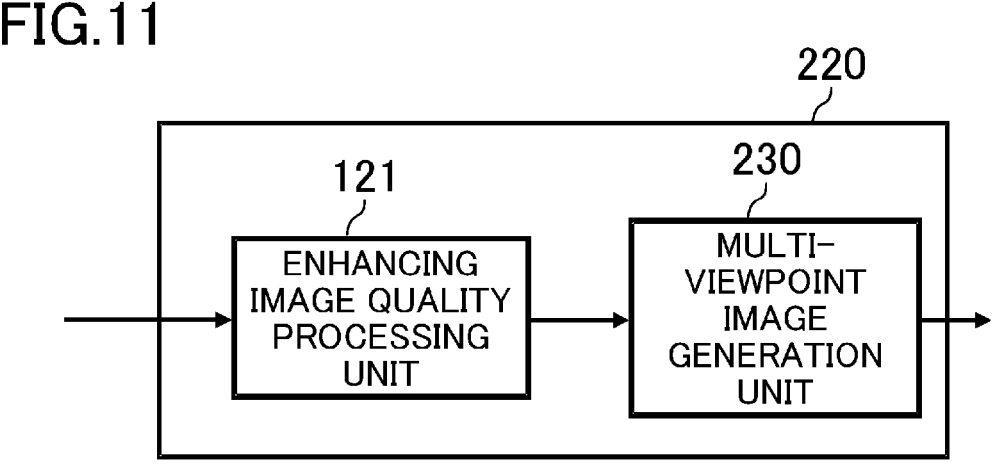
FIG. 11 is a diagram illustrating an example functional configuration of an image signal processing unit in FIG. 10.

FIG. 11 is a diagram illustrating an example functional configuration of the image signal processing unit 220. The image signal processing unit 220 illustrated in FIG. 11 includes an enhancing image quality processing unit 121 and a multi-viewpoint image generation unit 230. The enhancing image quality processing unit 121 has been already described in the first embodiment, and therefore, the description thereof will be omitted. The multi-viewpoint image generation unit 230 performs detection of the parallax amount, smoothing processing, and correction processing, which have been described in the first embodiment, and further performs stereoscopic image generation processing with more viewpoints than two.

Figure 12:
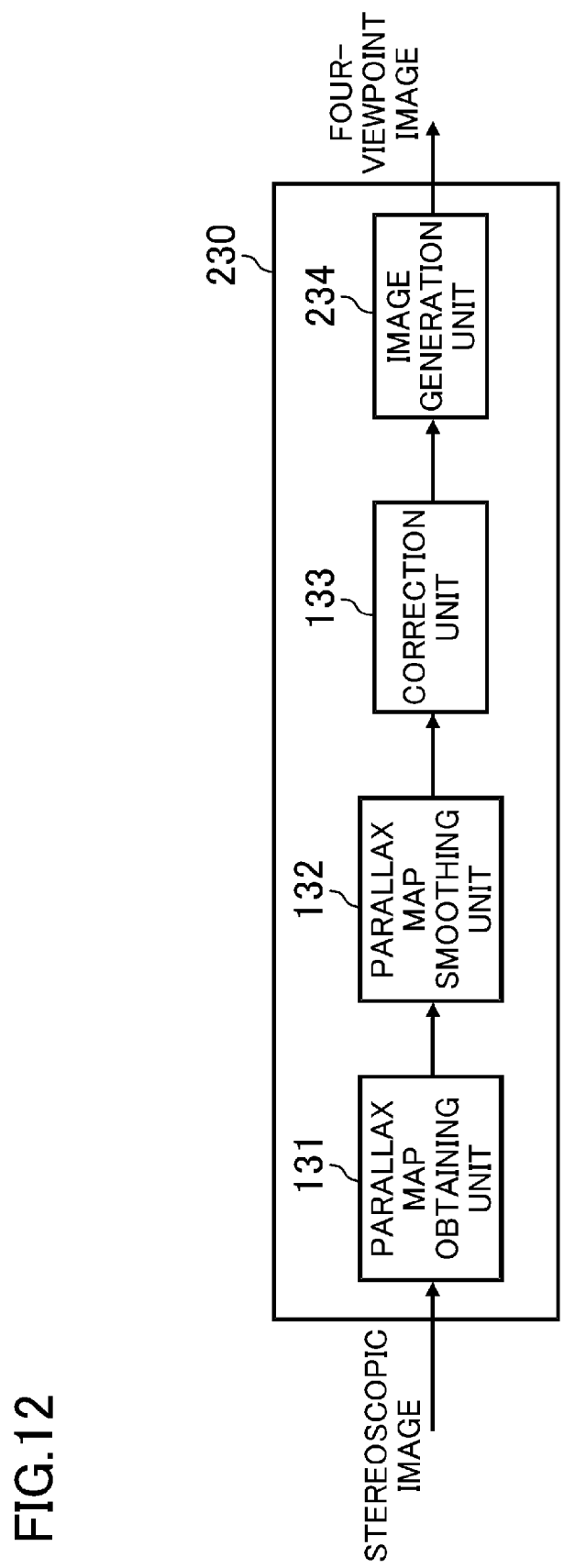
FIG. 12 is a diagram illustrating an example functional configuration of a multi-viewpoint image generation unit in FIG. 11.

FIG. 12 is a diagram illustrating an example functional configuration of the multi-viewpoint image generation unit 230. The multi-viewpoint image generation unit 230 illustrated in FIG. 12 includes a parallax map obtaining unit 131, a parallax map smoothing unit 132, a correction unit 133, and an image generation unit 234. The parallax map obtaining unit 131, the parallax map smoothing unit 132, and the correction unit 133 have been already described in the first embodiment, and therefore, the description thereof will be omitted.

The image generation unit 234 generates a stereoscopic image with more viewpoints than two, on the basis of a corrected parallax map. In this embodiment, a case where a four-viewpoint image is generated is described as an example, but the present disclosure is not limited thereto.

2-2. Operation

Figure 13:
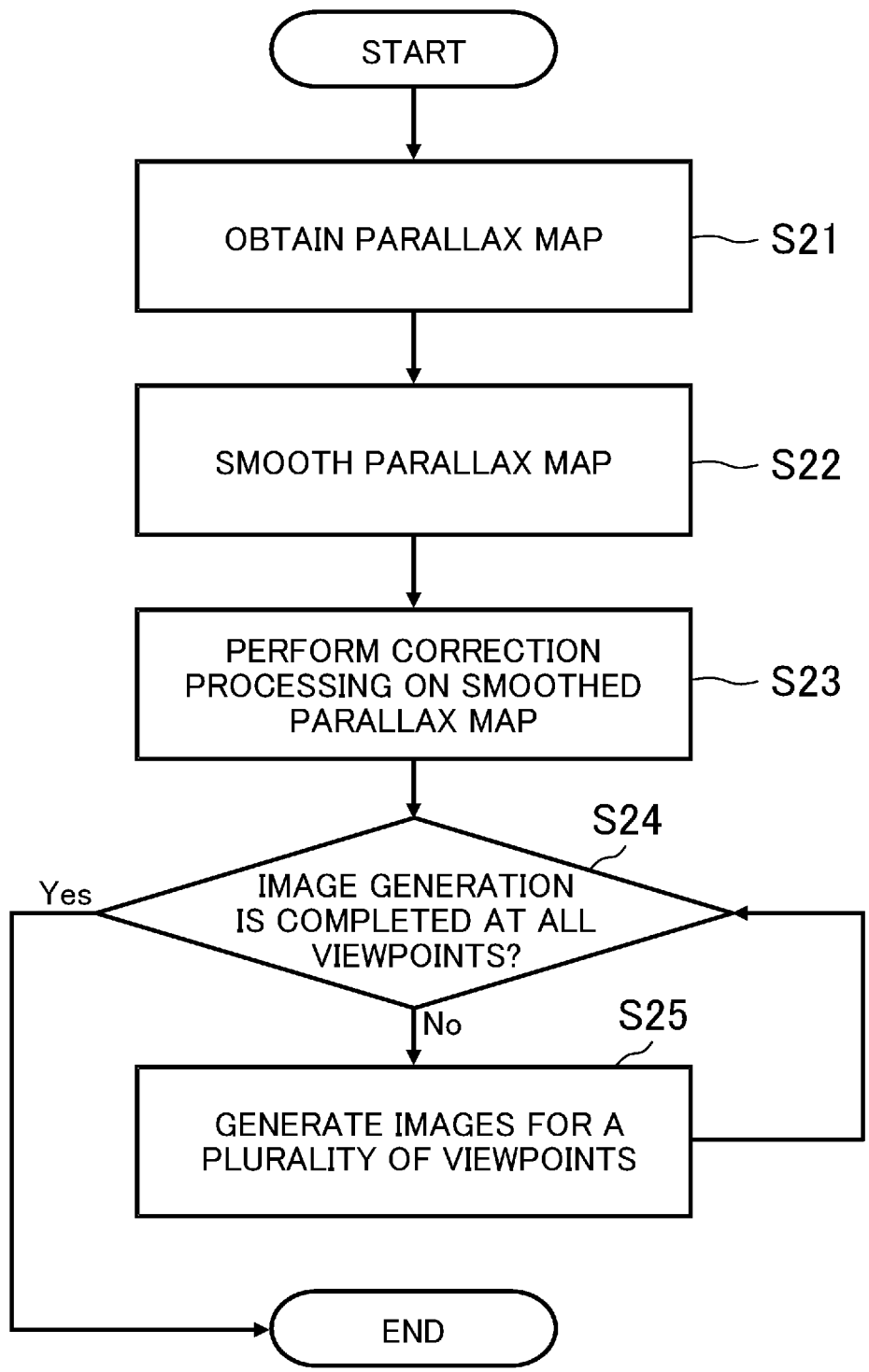
FIG. 13 is a flowchart of multi-viewpoint image generation processing according to the second embodiment.

FIG. 13 is a flowchart illustrating a flow of processing performed by the multi-viewpoint image generation unit 230. In FIG. 13, Steps S21-S23 are substantially the same as Steps S11-S13 in the flowchart of FIG. 4 described in the first embodiment, and therefore, the description thereof will be omitted.

(Step S24) The image generation unit 234 determines whether or not the generation of a stereoscopic image with a predetermined number of viewpoints is completed. In this case, the number of viewpoints is four, and thus, the image generation unit 234 determines whether or not the generation of stereoscopic images for four viewpoints is completed. If the generation of stereoscopic images for all of the viewpoints is completed, the process is ended. If there is any stereoscopic image whose generation is not completed, the process proceeds to Step S25.

(Step S25) The image generation unit 234 generates, on the basis of the corrected parallax map, a stereoscopic image whose generation is not completed. A method for generating each stereoscopic image is substantially the same as Step S14 in FIG. 4 which has been described in the first embodiment, and therefore, the description thereof will be omitted. When the generation and output of the stereoscopic images are completed, the process returns to Step S24.

The stereoscopic images output from the multi-viewpoint image generation unit 230 (the image generation unit 234) are output to the autostereoscopic display 201 and are displayed thereon.

An example where the image generation unit 234 generates a plurality of stereoscopic images will be described with reference to FIGS. 14A-14C.

Figure 14A:
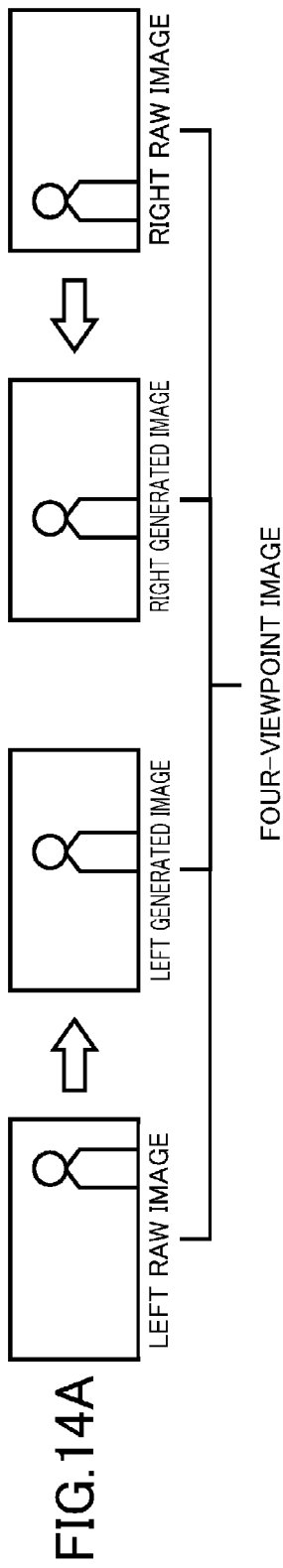
FIGS. 14A-14C are views illustrating examples of multi-viewpoint image generation.

In FIG. 14A, left and right raw images forming an input stereoscopic image, a left generated image generated from the left raw image at the right side thereof, and a right generated image generated from the right raw image at the left side thereof are four viewpoints. The image generation unit 234 can generate these images and combine the generated images into three different combinations, that is, a combination (1) of the left raw image and the left generated image, a combination (2) of the left generated image and the right generated image, and a combination (3) of the right generated image and the right raw image, to form three stereoscopic images. When the parallax amount of an input stereoscopic image is relatively large, a preferable stereoscopic effect can be achieved by the above-described generation method.

Figure 14B:
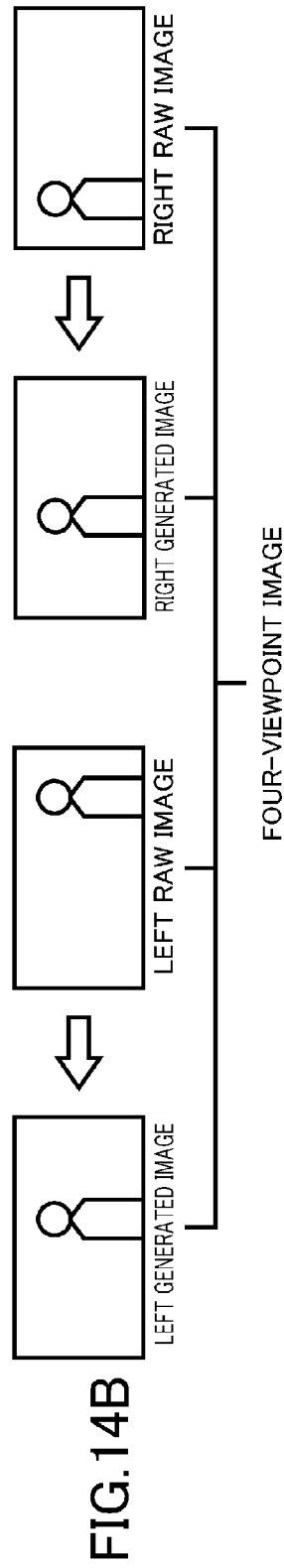

In FIG. 14B, left and right raw images, a left generated image generated from the left raw image at the left side, and a right generated image generated from the right raw image at the left side thereof are four viewpoints. The image generation unit 234 can generate these images and combine the generated images into three different combinations, that is, a combination (1) of the left generated image and the left raw image, a combination (2) of the left raw image and the right generated image, and a combination (3) of the right generated image and the right raw image, to form three stereoscopic images. When the parallax amount of an input stereoscopic image is at a medium level, a preferable stereoscopic effect can be achieved by the above-described generation method.

Note that, in the example of FIG. 14B, the left and right generated images are generated for the left and right raw images, respectively, such that each of the left and right generated images is provided at the left side of a corresponding one the left and right raw images, but the present disclosure is not limited thereto. In contrast, if the left and right generated images are generated for the left and right raw images, respectively, such that each of the left and right generated images is provided at the right side of a corresponding one the left and right raw images, the same advantages can be achieved.

Figure 14C:
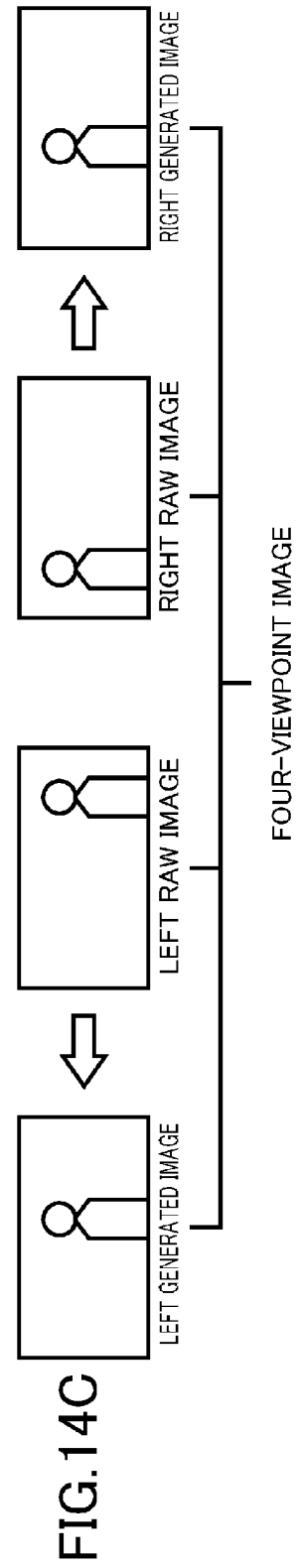

In FIG. 14C, left and right raw images, a left generated image generated from the left raw image at the left side thereof, and a right generated image generated from the right raw image at the right side thereof are four viewpoints. The image generation unit 234 can generate these images and combine the generated images into three different combinations, that is, a combination (1) of the left generated image and the left raw image, a combination (2) of the left raw image and the right raw image, and a combination (3) of the right raw image and the right generated image, to form three stereoscopic images. In the example of FIG. 14C, when the parallax amount of an input stereoscopic image is small, a preferable stereoscopic effect can be achieved by the above-described generation method.

Note that, in this embodiment, the correction unit 133 may be configured to determine the window size of the maximum value filter in accordance with a parallax adding amount when a multi-viewpoint image is generated.

2-3. Advantages, Etc.

In this embodiment, the image generation unit 234 generates an image with more viewpoints than two, on the basis of the corrected parallax map. Thus, even when there are a plurality of viewing positions where a stereoscopic image is viewed, that is, when an autostereoscopic display is used, etc., a multi-viewpoint stereoscopic image can be generated and be presented to the viewer.

Note that, in this embodiment, the case where a stereoscopic image corresponding to four different viewpoints is generated has been described, but the contents disclosed herein are not limited thereto. Furthermore, a stereoscopic image corresponding to more viewpoints than four may be generated.

Other Embodiments

The first and second embodiments have been described above to illustrate examples of the technology of the present disclosure. However, the technology of the present disclosure is not limited thereto, and may be applied to embodiments where modifications, replacement, addition, and deletions, etc., are made. Also, a new embodiment may be devised by combining one of the components described in the first and second embodiment with another.

In the above-described first and second embodiments, the parallax map is detected from the stereoscopic image signal. The parallax map may be, for example, transmitted with the stereoscopic image signal from the outside. Also, the parallax map is an example of the depth information, and for the depth information indicating the depth value in each position in the image plane of the stereoscopic image, the contents of the present disclosure can be used.

In the above-described first and second embodiments, correction processing of the smoothed parallax map is realized by filter processing. Other than filter processing, as processing for realizing the correction processing, for example, an edge between the foreground and the background may be detected from an image, the foreground area may be specified from the detected edge, and then, the parallax amount of the foreground area may be corrected.

In the above-described first and second embodiments, the contents of the present disclosure have been described using, as an example, the case where a stereoscopic image display device is used. However, the contents of the present disclosure are not limited thereto. For example, a device corresponding to each of the stereoscopic image display devices 100 and 200 described in the first and second embodiments from which a corresponding one of the display panel 113 and the autostereoscopic display 201 is omitted may be implemented as an image signal processing device according to the present disclosure. Similar functions to those of the stereoscopic image display devices described in the first and second embodiments can be realized by outputting an image signal processed (output) by such an image signal processing device to a monitor. Also, a device having a still another configuration including the image generation units 134 and 234 may be implemented as an image signal processing device according to the present disclosure.

In the above-described first and second embodiments, each of the image signal processing units 120 and 220 has been described as an independent component from the CPU 110, but the contents of the present disclosure are not limited thereto. The function realized by each of the image signal processing units 120 and 220 may be a function realized by a controller chip by a hardware, such as an independent IC etc., and as another alternative, may be a function which is realized as a software program which operates on the CPU 110.

Embodiments have been described above as illustrative examples of the technology in the present disclosure. For that, the attached and the detailed description are provided.

Therefore, the components described in the attached drawings and the detailed description may include not only a component essential for solving the problems but also components non-essential for solving the problems, in order to illustrate the technology described above. Thus, the non-essential components should not immediately recognized as being essential because the non-essential components are described in the attached drawings and the detailed description.

The above-described embodiments are intended to illustrate examples of the technology of the present disclosure. Therefore, various modifications, replacement, addition, and deletions, etc. may be applied to the components within the scope of claims or within the equivalent scope.

The present disclosure is applicable to an image signal processing device which generates a more natural stereoscopic image. Specifically, the present disclosure is effective for a TV set, and a tablet, etc., which displays a stereoscopic image, and a recorder which records and plays back a stereoscopic image, etc.

What is claimed is:

1. An image signal processing device which processes an input stereoscopic image signal, the device comprising:
    an obtaining unit configured to obtain, for the stereoscopic image signal, depth information indicating a depth value for each of a plurality of positions in an image plane;
    a smoothing unit configured to smooth the depth information in the image plane to produce smoothed depth information, the smoothed depth information including depth information of foreground portions each having a foreground depth value, background portions each having a background depth value, and boundary portions each being between one of the foreground portions and one of the background portions and each having a boundary depth value between the foreground depth value and the background depth value;
    a correction unit configured to correct the smoothed depth information to produce corrected depth information by changing the smoothed depth information of one or more of the boundary portions to the foreground depth value thereby making at least part the one or more of the boundary portions belong to the foreground portions to expand a range of an area having the foreground depth value; and
    an image generation unit configured to generate a new stereoscopic image based on the corrected depth information.

2. The image signal processing device of claim 1, wherein the image generation unit generates, as the new stereoscopic image, an image with more than two viewpoints.

3. The image signal processing device of claim 1, wherein the smoothing unit is configured to adjust an intensity of smoothing, and
the correction unit is configured to adjust an intensity of correction in accordance with the intensity of smoothing in the smoothing unit.

4. The image processing device of claim 1, wherein the image generation unit has a function of performing stereoscopic effect correction on the new stereoscopic image, and
the correction unit is configured to adjust an intensity of correction in accordance with a correction amount of the stereoscopic effect correction in the image generation unit.

5. An image signal processing method for processing a stereoscopic image signal, the method comprising:
    obtaining, for the stereoscopic image signal, depth information indicating a depth value for each of a plurality of positions in an image plane;
    smoothing the depth information in the image plane to produce smoothed depth information, the smoothed depth information including depth information of foreground portions each having a foreground depth value, background portions each having a background depth value, and boundary portions each being between one of the foreground portions and one of the background portions and each having a boundary depth value between the foreground depth value and the background depth value;

correcting the smoothed depth information to produce corrected depth information by changing the smoothed depth information of one or more of the boundary portions to the foreground depth value thereby making at least part of the one or more of the boundary portions belong to the foreground portions to expand a range of an area having the foreground depth value; and generating a new stereoscopic image based on the corrected depth information.

6. The image processing device of claim 1, wherein at least one of the obtaining unit, smoothing unit, correction unit, and image generation unit are constituted by a controller chip.

7. The image processing device of claim 1, wherein at least one of the obtaining unit, smoothing unit, correction unit, and image generation unit are constituted by an independent IC.

8. The image processing device of claim 1, wherein at least one of the obtaining unit, smoothing unit, correction unit, and image generation unit are constituted by a processor and a memory having program stored thereon that operates the processor.

* * * * *